US010995550B2

(12) United States Patent
Yousef et al.

(10) Patent No.: US 10,995,550 B2
(45) Date of Patent: May 4, 2021

(54) WELLBORE RIG TOP DRIVE

(71) Applicant: Nabors Drilling Technologies USA, Inc., Houston, TX (US)

(72) Inventors: Faisal Yousef, Houston, TX (US); Ernesto Rivera, Spring, TX (US); Tommy Vu, Houston, TX (US); Randy Pyrch, Montgomery, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 237 days.

(21) Appl. No.: 15/859,606

(22) Filed: Dec. 31, 2017

(65) Prior Publication Data

US 2019/0203535 A1 Jul. 4, 2019

(51) Int. Cl.
 *E21B 3/02* (2006.01)
 *F16C 19/36* (2006.01)
 *F16C 19/30* (2006.01)

(52) U.S. Cl.
 CPC .............. *E21B 3/02* (2013.01); *F16C 19/305* (2013.01); *F16C 19/364* (2013.01); *F16C 2352/00* (2013.01)

(58) Field of Classification Search
 CPC ........................................................ E21B 3/02
 See application file for complete search history.

(56) References Cited

U.S. PATENT DOCUMENTS

| | | | | |
|---|---|---|---|---|
| 2,998,084 A | * | 8/1961 | Johnson ..................... | E21B 3/04 175/85 |
| 4,449,596 A | * | 5/1984 | Boyadjieff .............. | E21B 19/16 166/77.52 |
| 5,251,709 A | * | 10/1993 | Richardson ............. | E21B 19/02 175/162 |
| 6,913,096 B1 | | 7/2005 | Nielsen et al. | |
| 9,556,690 B1 | * | 1/2017 | Marquez ................. | E21B 19/06 |
| 2004/0069532 A1 | * | 4/2004 | Keast ........................ | E21B 3/02 175/57 |
| 2005/0274508 A1 | * | 12/2005 | Folk ......................... | E21B 19/02 166/77.52 |
| 2008/0210437 A1 | * | 9/2008 | Wells ........................ | E21B 3/02 166/379 |
| 2009/0000780 A1 | * | 1/2009 | Wells ...................... | E21B 19/02 166/78.1 |
| 2011/0280104 A1 | * | 11/2011 | McClung, III ............ | E21B 3/02 367/82 |
| 2013/0299247 A1 | * | 11/2013 | Kuttel ....................... | E21B 3/02 175/170 |
| 2017/0159360 A1 | * | 6/2017 | Netecke .................... | E21B 3/02 |

FOREIGN PATENT DOCUMENTS

CA 2390365 C 11/2003

* cited by examiner

*Primary Examiner* — Kipp C Wallace (57) ABSTRACT

A wellbore rig top drive is disclosed. The wellbore rig top drive can include a main bearing housing. The wellbore rig top drive can also include a main bearing supported by the main bearing housing. The main bearing can be configured to support a weight of a wellbore string and facilitate rotation of the wellbore string about an axis. The wellbore rig top drive can further include a quill supported by the main bearing and configured to rotate about the axis. The quill can be coupleable to the wellbore string. In addition, the wellbore rig top drive can include a drive motor disposed below the main bearing and supported by the main bearing housing. The drive motor can be coupled to the quill to provide torque to rotate the quill about the axis.

23 Claims, 3 Drawing Sheets

WELLBORE RIG TOP DRIVE

BACKGROUND

A top drive is used in oilfield operations to manipulate a wellbore string, such as a drill string or a casing or liner string. The top drive is typically supported in a rig, such as a mast or derrick, via a supporting apparatus that includes a pulley system with a traveling block coupled to the top drive via a becket, a bail, and upper links. The top drive provides torque to the wellbore string to drill a borehole. The top drive can also move vertically up and down the rig via the pulley system to string or remove pipes.

Conventional top drives have a drive motor that applies torque to a wellbore string via a drive quill. The drive motor and the drive quill are often mechanically coupled by a gear system or other such drive train. Typically, top drive arrangements have the hoisting load path components placed together as compact as possible, with the propulsion motor located above the thrust bearing housing. Indeed, in a typical top drive, the drive motor is located on top of a main housing or support structure that is configured to support the weight of the wellbore string and enable rotation of the string (i.e., a swivel). In this arrangement, the drive quill is typically supported below the drive motor and/or laterally offset from the drive motor in top drives that utilize gearing to couple the drive motor and the drive quill.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although top drives have proven effective in the field, the typical drive motor arrangement does have some shortcomings. With the drive motor located above or on top of the main support structure (e.g., the swivel) and the main bearing and main bearing housing, the apparatus for suspending the top drive from the rig (e.g., the upper links, bail, becket, etc.), which is located at the top end of the top drive, must be large enough to physically accommodate the drive motor in the space at the top end of the top drive. The wide and tall geometry needed to accommodate the drive motor widens the coupling location of the upper links to the main support structure and increases the length of the upper links. This geometry also results in a large (i.e., wide) main support structure, which increases the weight of the main support structure. The result is large and heavy links that can withstand the loading created by the wide and tall geometry necessary to accommodate the drive motor. The typical drive motor arrangement is also difficult to maintain and service.

Accordingly, a wellbore rig top drive is disclosed that is reduced in size and weight compared to typical top drives, and is easier to maintain. The wellbore rig top drive can include a main bearing housing. The wellbore rig top drive can also include a main bearing supported by the main bearing housing. The main bearing can be configured to support a weight of a wellbore string and facilitate rotation of the wellbore string about an axis. The wellbore rig top drive can further include a quill supported by the main bearing and configured to rotate about the axis. The quill can be coupleable to the wellbore string. In addition, the wellbore rig top drive can include a drive motor disposed below the main bearing and supported by the main bearing housing. The drive motor can be coupled to the quill to provide torque to rotate the quill about the axis.

In one aspect, a wellbore rig top drive system is disclosed that can include a wellbore string and a wellbore rig top drive coupled to and supporting the wellbore string. The wellbore rig top drive can include a main bearing housing. The wellbore rig top drive can also include a main bearing supported by the main bearing housing. The main bearing can be configured to support a weight of the wellbore string and facilitate rotation of the wellbore string about an axis. The wellbore rig top drive can further include a quill supported by the main bearing and configured to rotate about the axis. The quill can be coupled to the wellbore string. Additionally, the wellbore rig top drive can include a drive motor disposed below the main bearing and supported by the main bearing housing. The drive motor can be coupled to the quill to provide torque to rotate the quill about the axis. In one aspect, the drive motor can comprise a stator integrally formed with the main bearing housing. In another aspect, the main bearing housing can comprise a drive motor housing. The drive motor can comprise an active portion located below the main bearing.

Also disclosed is a wellbore rig top drive, comprising a main bearing housing; a main bearing supported by the main bearing housing, the main bearing being configured to support a weight of a wellbore string and facilitate rotation of the wellbore string about an axis; a quill supported by the main bearing and configured to rotate about the axis, the quill being coupleable to the wellbore string; and a drive motor coupled to the quill to provide torque to rotate the quill about the axis, the drive motor being integrally formed with the main bearing housing, wherein at least a portion of the drive motor is disposed below the main bearing.

Figure 1:
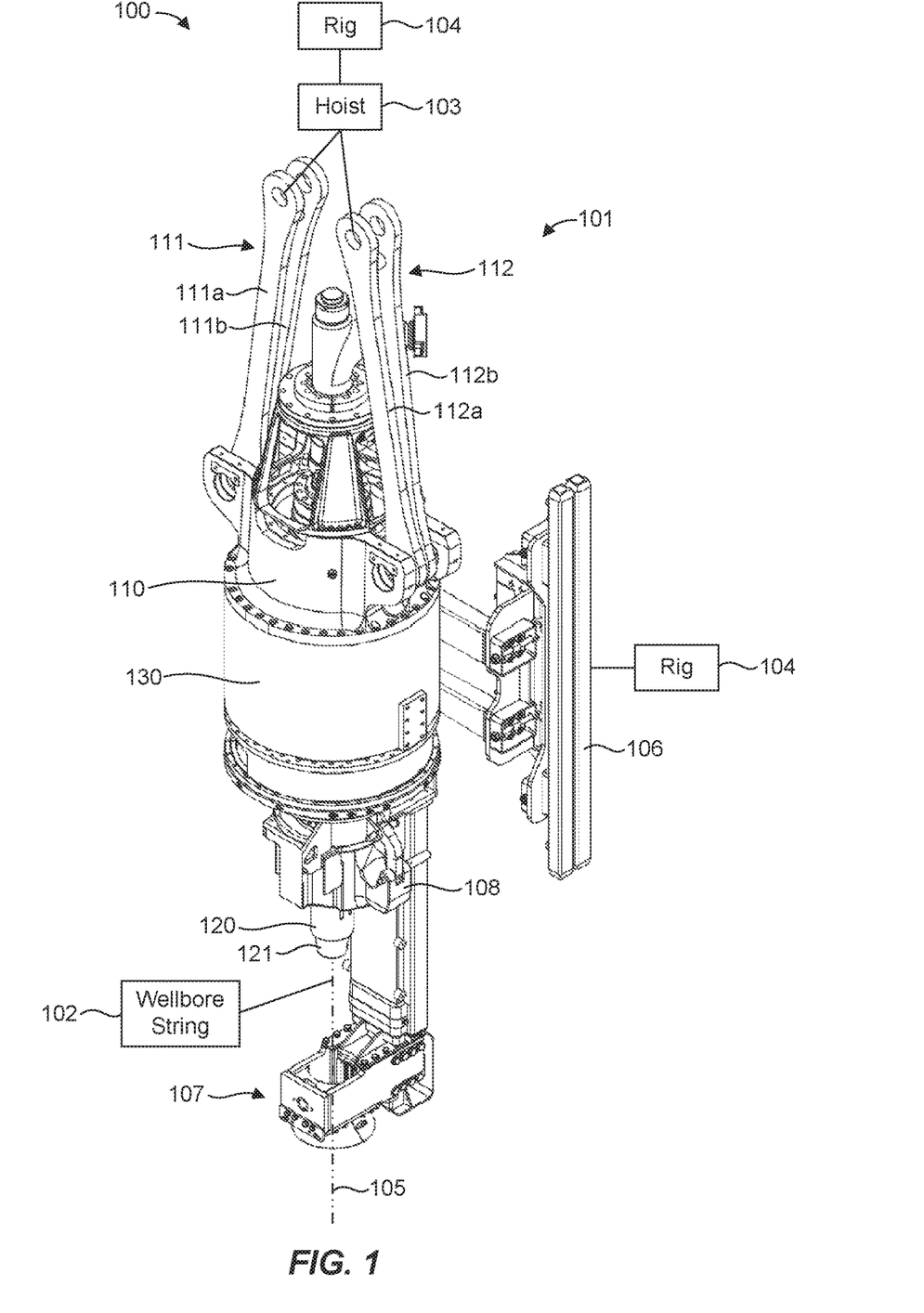
FIG. 1 is an illustration of a wellbore rig top drive system in accordance with an example of the present disclosure.

To further describe the present technology, examples are now provided with reference to the figures. With reference to FIG. 1, one example of a wellbore rig top drive system 100 is illustrated. The system 100 can comprise a wellbore rig top drive 101 and a wellbore string 102 (e.g., a drill string, a casing or liner string, etc.). The top drive 101 can be coupled to and can support the wellbore string 102. In addition, the system 100 can include a lifting or hoisting apparatus 103 (e.g., a pulley arrangement with a traveling block, a rack and pinion gear, etc.) coupled to and supporting the top drive 101 from a wellbore rig 104. The top drive 101 can be moved up/down relative to the rig 104 by the hoisting apparatus. The hoisting apparatus 103 can lower and raise the top drive 101, and thus the wellbore string 102, parallel to an axis 105 that may correspond to a wellbore centerline.

The top drive 101 can include a main bearing housing 110 that provides the primary mechanical support for the top drive's components. The top drive 101 can include upper links 111, 112 configured to extend upward to facilitate suspending the top drive 101 from the rig 104. The upper links 111, 112 can be directly coupled to the main bearing housing 110, such as via pins (not shown). The upper links 111, 112 can be configured to extend upward to facilitate coupling the top drive 101 to the hoisting apparatus 103. For example, a bail (not shown) can be coupled to top ends of the upper links 111, 112. The bail can interface with a becket (not shown) connected to the hoisting apparatus 103 to suspend the top drive 101 from the hoisting apparatus 103.

In the illustrated embodiment, the upper links 111, 112 each include two parallel link components, although it should be recognized that an upper link can have any suitable number of link components or segments (e.g., only a single link or any suitable number of individual link components), which can be arranged in parallel and/or in series. For example, in some embodiments, an upper link can have multiple link segments or separable link sections arranged in series. In addition, a link component can have any suitable structural configuration, such as a rigid link configuration or an expanding/contracting link configuration (e.g., slotted configuration).

The top drive 101 can include a drive quill 120 that is coupleable to the wellbore string 102. The drive quill 120 can extend downwardly for connection directly, or indirectly as through a clamp etc., to the wellbore string 102. The drive quill 120 can be driven by a drive motor 130 to cause rotation of the wellbore string 102 about the axis 105. The drive quill 120 can include an interface portion 121 to facilitate coupling with the wellbore string 102 in a rotationally fixed manner, such as via a screw (i.e., threaded) connection, to provide torque to the wellbore string 102. Thus, the top drive 101 can provide for the rotary drive and the lowering and raising of the wellbore string 102.

The top drive 101 can also include a torque reaction frame 106 (e.g., a torque rack) coupleable to the wellbore rig 104 to react torque produced by the drive motor 130 to stabilize the top drive 101 and facilitate rotation of the wellbore string 102 about the axis 105. In one aspect, the torque reaction frame 106 can be configured to interface with and to be guided in a mast (not shown) of the wellbore rig 104 during operation. In this case, reaction moments can be introduced into the mast during operation via the torque reaction frame 106.

The top drive 101 can further include a back-up wrench 107 (e.g., a pipe gripper) for selectively gripping tubulars or pipes (e.g., to make and break tubular connections). The back-up wrench can be suspended from a load collar or ring 108.

Lower links (not shown) can suspend an elevator (not shown) from the load collar 108. The lower links and elevator can be typical of those known in the art. The load collar 108 can be configured to support the weight of the wellbore string 102 when the wellbore string 102 is supported by the top drive 101 through the lower links and elevator, but is not connected to the drive quill 120. In some embodiments, the lower links can be selectively tilted to cause selective movement and tilting of the elevator, which can cause movement of a tubular or stand of tubulars supported by the elevator toward or away from the axis 105 to facilitate stringing or removing tubulars.

Figure 2:
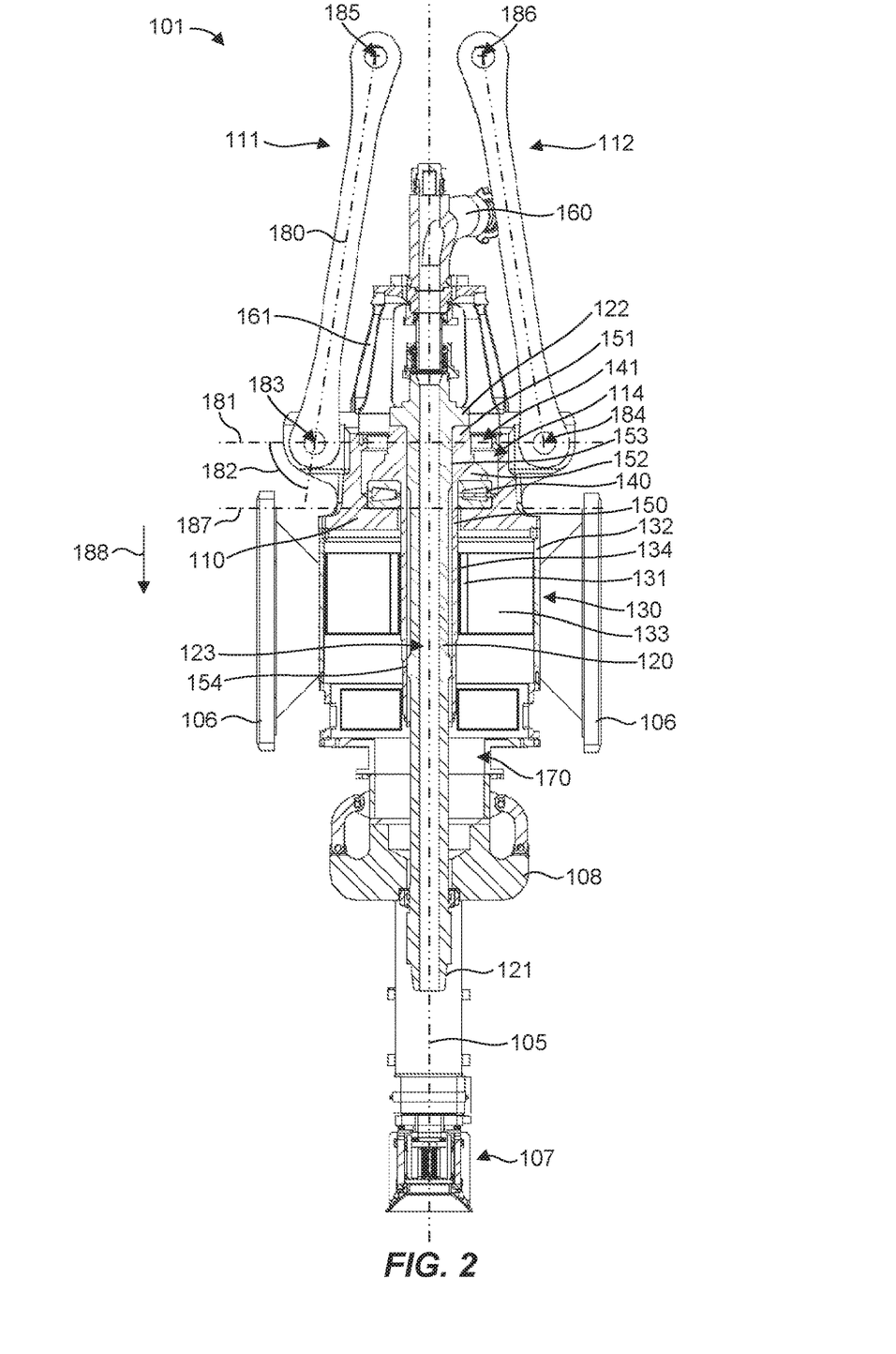
FIG. 2 is a cross-sectional view of a wellbore rig top drive of the system of FIG. 1.

With continued reference to FIG. 1 internal components of the top drive 101 are shown in FIG. 2, which illustrates a cross-section of the top drive 101.

The top drive 101 can include a main bearing 140 supported by the main bearing housing 110. For example, the main bearing 140 can be located in a recess 114 of the main bearing housing 110. In addition, the drive quill 120 can be supported by the main bearing 140 and configured to rotate about the axis 105.

In some embodiments, the top drive 101 can include a spindle 150 between the drive quill 120 and the main bearing 140. For example, the spindle 150 can have a hollow center or opening that is configured to receive the drive quill 120, which can extend through the spindle 150. An outwardly extending load flange 122 of the drive quill 120 can interface with, and rest on, a top portion 151 of the spindle 150. An outwardly extending load flange 152 of the spindle 150 can interface with, and rest on, the main bearing 140, which receives the spindle 150 and the drive quill 120 through a center opening in the main bearing 140. In this manner, the drive quill 120 can rotate on the main bearing 140, but can interface with the spindle 150.

The load flange 122 of the drive quill 120 and the load flange 152 of the spindle 150 can bear the weight of the wellbore string 102. By supporting the spindle 150 and the drive quill 120, the main bearing 140 can support the weight of the wellbore string 102 while facilitating rotation of the wellbore string 102 about the axis 105. The main bearing housing 110 and the main bearing 140 can therefore rotationally support the drive quill 120 during use. In one aspect, an optional secondary bearing (not shown) can be included at 141 and supported by the main bearing housing 110. The main bearing 140 and a secondary bearing can be operable together to support and maintain the drive quill 120 in place radially and axially during use, such as during drilling operations. For example, the top portion 151 of the spindle 150 can be configured to interface with a secondary bearing at 141, which, due to the interface between the spindle 150 and the drive quill 120, can constrain and support the drive quill 120. Thus, the main bearing housing 110 can function as a swivel body, and the main bearing housing 110 in combination with the main bearing 140 (and an optional secondary bearing), can function as a swivel for the drive quill 120.

The main bearing 140 and a secondary bearing can comprise any suitable type of bearing or combination of bearings, such as a thrust bearing, a radial bearing, etc. In one embodiment, the main bearing 140 can comprise a V flat type thrust bearing that has multiple tapered rollers. In another embodiment, a secondary bearing can comprise a conical or tapered roller bearing.

As mentioned above, the top drive 101 can include the drive motor 130 coupled to the drive quill 120 to provide or apply torque to the quill 120 to rotate the drive quill 120 about the axis 105. The drive quill 120 can have a hollow center opening or flow bore 123 through which drilling fluid may flow. A gooseneck 160 can extend through a bonnet 161 and can be connected to a hose (not shown) for delivering drilling fluid to the flow bore 123 through the drive quill 120. Thus, fluid pumped into the top drive 101 through the gooseneck 160 passes through the drive quill 120, the wellbore string 102, and a drill bit at the bottom end of the wellbore string 102 and enters the bottom of an earth bore.

The top drive 101 can also include a brake system 170 for the drive quill 120, which may be used in emergencies. The brake system 170 can operate selectively (e.g., by an operator) and/or automatically. The brake system 170 can be mounted toward a bottom end of the top drive 101 (e.g., below the drive motor 130) proximate the load collar 108. This mounting location of the brake system 170 can provide easy access to the brake system 170, which is located away from the bonnet 161 and hose associated with the gooseneck 160.

In general, the drive motor 130 (i.e., a prime mover) is any machine or device configured to convert one form of energy (e.g., electrical energy, chemical energy, etc.) into mechanical energy or torque for driving the drive quill 120. Thus, the drive motor 130 generally includes a rotor 131, a stator 132, and an active portion 133. The rotor 131 is the rotary part (e.g., a rotor of an electric motor, a crank shaft of an IC engine or a fluid actuator (e.g., hydraulic or pneumatic), and others) of the drive motor 130, the stator 132 is the stationary part (e.g., the stator of an electric motor, the cylinder block of an IC engine, the cylinder of a fluid actuator) of the drive motor 130, and the active portion 133 couples the rotor 131 and the stator 132 and includes the structures or components that perform the energy conversion (e.g., a magnet and coiled wire for induction of an electric motor, a piston and cylinder for a combustion chamber of an IC engine or fluid actuator, and others) into mechanical torque. The drive motor 130 can comprise any suitable type of motor, such as an electric motor, a hydraulic motor, and others. Electric motors can include an alternating current motor (e.g., an induction motor) or a direct current motor. In some examples, the drive motor 130 can comprise any suitable permanent magnet motor, such as an alternating current permanent magnet motor. It is noted that due to the wide variety of possible configurations, certain portions of the top drive represented in the figures (including those pertaining to the drive motor) are shown generally with many details hidden as they are not relevant to the discussion herein.

As shown in FIG. 2, the drive motor 130 can be configured as a hollowbore motor, and the drive quill 120 and the spindle 150, which are supported by the main bearing housing 110 above the drive motor 130, can extend downward through the drive motor 130. The drive quill 120 can further extend through the load collar 108 where the interface portion 121 at an end of the drive quill 120 is exposed for coupling with the wellbore string 102. As with other components of the top drive 101, the drive motor 130 can be supported by the main bearing housing 110. Thus, in one example, at least a portion of the drive motor 130 can be disposed below or under the main bearing housing 110 and/or the main bearing 140 (i.e., the swivel). For example, a plane 187 perpendicular to the axis 105 can be defined at a bottom or lowermost part of the main bearing 140 in a direction 188 toward a bottom end of the top drive 101. A given portion of the drive motor 130 (e.g., at least a portion of the rotor 131, the stator 132, and/or the active portion 133) is considered below or under the main bearing 140 if such portion of the drive motor 130 is located below or under the plane 187 in the direction 188 toward the bottom end of the top drive 101. Thus, a given portion of the drive motor 130 can be laterally located relative to the main bearing 140 (e.g., radially outward from the axis 105) and still be considered below or under the main bearing 140 if the portion of the drive motor 130 is located below or under the plane 187 in the direction 188 toward the bottom end of the top drive 101. In one aspect, at least a portion of the drive motor 130 can be located between the main bearing housing 110 and/or the main bearing 140 (e.g., the plane 187) and the interface portion 121 of the drive quill 120. For example, the stator 131 can be coupled to the main bearing housing 110, such that at least portions of the stator 131, the rotor 132, and/or the active portion 133 are disposed below the main bearing housing 110 and/or the main bearing 140 (e.g., the plane 187). In addition, at least portions of the stator 131, the rotor 132, and/or the active portion 133 are above the interface portion 121 of the drive quill 120, which extends below the drive motor 130 for coupling with the wellbore string 102. In one aspect, the active portion 133 can be located entirely below the main bearing housing 110 and/or the main bearing 140. In another aspect, the rotor 121 can be located entirely or partially below the main bearing housing 110 and/or the main bearing 140. It is noted that the term "below" is intended to refer to the location of the drive motor, or portions thereof, relative to the main bearing housing and/or main bearing with the top drive in the orientation shown in the drawings. As such, the term "below" should not be construed to be limited to a location of the drive motor only in the vertical in the event the top drive comprises a different orientation.

The drive motor 130 can be coupled to the main bearing housing 110 in any suitable manner. For example, the stator 131, which can be configured as a housing for the drive motor 130, can be coupled directly or indirectly to the main bearing housing 110 (e.g., by threaded fasteners, rivets, welds, or via other components for an indirect coupling).

In one example, drive motor 130 can be integrally formed with the main bearing housing 110, such that the main bearing housing can comprise a drive motor housing. In other examples, the drive motor 130 can be integrally formed with the main bearing housing 110, wherein the stator 132 can be integrally formed with the main bearing housing 110 as a unitary, monolithic structure. Thus, in these cases, a structural portion (e.g., drive motor housing, stator) of the drive motor 130 can be integrated with the main bearing housing 110, with at least one of the rotor 121, the stator 131 or the active portion 133 of the drive motor 130, or portions thereof, located or positioned below the main bearing 140. In one aspect, the main bearing housing 110 can comprise at least a portion of the stator 131. In another aspect, the stator 131 can comprise an independent component of the drive motor 130 supported by or within the main bearing housing 110. In both of these examples, the active portion 133 of the drive motor 130 can be located below the main bearing 110.

In some embodiments, the drive motor 130 can be configured to apply torque to the drive quill 120 below the main bearing housing 110 and/or the main bearing 140, such as at a coupling interface 134. In one aspect, the drive motor 130

(e.g., the rotor 131) can be coupled to the quill 120 in a direct drive configuration or relationship, such that the drive motor 130 and the quill 120 rotate at the same speed. For example, the drive motor 130 can be directly or indirectly coupled (e.g., via the spindle 150) to the drive quill 120 without an intermediate gear mechanism or drive train. Thus, an axis of the drive motor 130 and an axis of the drive quill 120 can be collinear with the axis 105. A direct drive relationship between the drive motor 130 and the drive quill 120 greatly simplifies the power transmission chain. This can improve transmission efficiency and reduce moving parts and therefore improve reliability, which reduces service and maintenance requirements.

The spindle 150, which is disposed between the drive motor 130 and the drive quill 120, can be coupled to the drive motor 130 and the drive quill 120 in a rotationally fixed manner. In this case, the drive motor 130 (i.e., the rotor 131) transfers torque to the spindle 150, and the spindle 150 transfers torque to the drive quill 120. The drive motor 130 (i.e., the rotor 131) can include a hollow bore interface at 134 that facilitates coupling the drive motor 130 to the spindle 150 to transfer torque to the spindle 150. The spindle 150 and the drive quill 120 can be coupled to one another proximate the top portion 151 and load flange 152 of the spindle 150 at 153 and lower proximate the drive motor 130 at 154. The respective adjacent components of the drive motor 130, the spindle 150, and the drive quill 120 can be rotationally fixed to one another in any suitable manner, such as via a splined interface, a key, a hub with a key, or a keyless locking device, etc. In some embodiments, the drive motor 130 (e.g., the rotor 131), the spindle 150, and/or the drive quill 120 can be integrally formed with one another as a unitary, monolithic structure.

Figure 3:
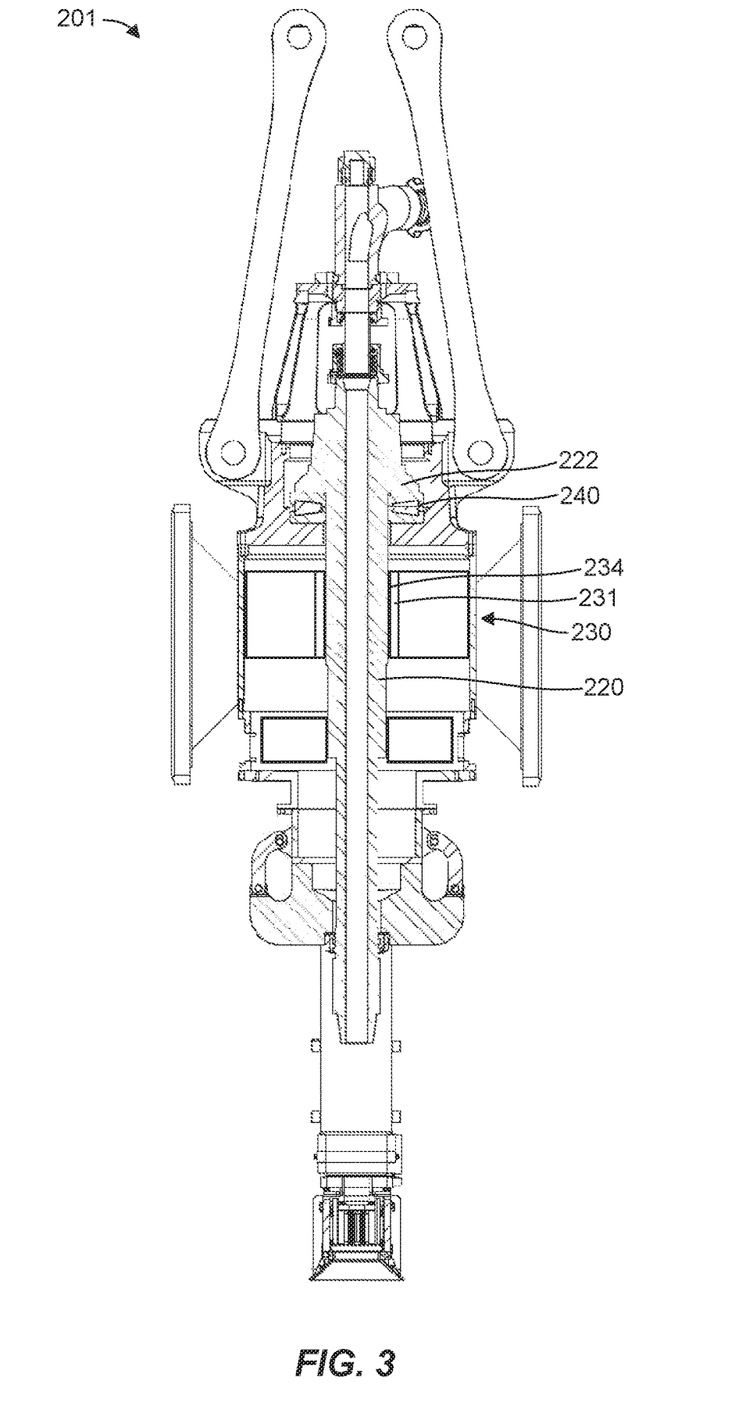
FIG. 3 is a cross-sectional view of a wellbore rig top drive in accordance with another example of the present disclosure.

In one embodiment, shown in FIG. 3, a top drive 201 in accordance with another example of the present disclosure can be configured such that a drive motor 230 is coupled directly to a drive quill 220, without an intermediate spindle. In this case, an outwardly extending load flange 222 of the drive quill 220 can interface with, and rest on, a main bearing 240, which receives the drive quill 220 through a center opening in the main bearing 240. The drive motor 230 (e.g., a rotor 231) can be configured to apply torque to the drive quill 220 at a coupling interface 234. The drive motor 230 (e.g., the rotor 231) and the drive quill 220 can be rotationally fixed to one another in any suitable manner, such as via a splined interface, a key, a hub with a key, or a keyless locking device, etc. In some embodiments, the rotor 231 and the drive quill 220 can be integrally formed with one another as a unitary, monolithic structure.

With further reference to FIGS. 1 and 2, in some embodiments, an axial load path supporting axial loads from the wellbore string 102 passes through the drive quill 120 (and through the optional spindle 150) into the main bearings 140, through the main bearing housing 110, and into the upper links 111, 112. In this case, the drive motor 130 advantageously is not in the axial load path supporting axial loads from the wellbore string 102. Thus, axial loads provided through the wellbore string 102 (e.g., the weight of the wellbore string 102 or upward force acting on the wellbore string 102) are not supported by the drive motor 130 or any component of the drive motor 130 (e.g., the stator 132). The drive motor 130 can therefore be sized and configured merely to provide torsional torque to rotate the wellbore string 102, which can enable the use of a smaller motor that is not structurally reinforced or designed to support wellbore string axial loading (e.g., string weight).

Furthermore, by locating the drive motor 130 below the main bearing housing 110 and/or the main bearing 140 (i.e., the swivel), a length 180 of the upper links 111, 112 and a coupling distance 181 between the upper links 111, 112 to the main bearing housing 110 can be reduced or minimized as compared to prior setups in prior top drive assemblies with the drive motor located on top of or above the main bearing and/or main bearing housing. This is because, with the present technology discussed herein, the structures at the top end of the top drive 101 (e.g., the bonnet 161 and the gooseneck 160) are smaller and occupy less space than these otherwise would need to with a drive motor present above the main bearing housing and/or main bearing, so the geometry of the upper links to accommodate such structures can be reduced in size relative to prior top drive assemblies. Consequently, the main bearing housing 110 can also be reduced in size (i.e., made narrower) as compared to prior setups in prior top drive assemblies with the drive motor located on top of or above the main bearing and/or main bearing housing. In some examples, the bonnet 161 can be coupled directly to the main bearing housing 110. In some examples, the upper links 111, 112 can be formed or extend on an angle 182 relative to the longitudinal axis 105 of the top drive 101 and relative to a plane extending between lower coupling portions 183, 185 of the upper links 111, 112, respectively, the plane being perpendicular to the axis 105 of the top drive 101, the upper links 111, 112 being oriented on such an angle when the top drive 101 supported about the rig and in a position for use. In a more specific example, the upper links 111, 112 and a longitudinal axis in each of the upper links 111, 112 (e.g., see longitudinal axis 180 of link 111, with the upper link 112 comprising a similar configuration and longitudinal axis even though not shown) can be formed or extend on an angle (see angle 182 shown with respect to upper link 111, but the same angle can be applicable to the upper link 112) relative to a plane 181 extending through the lower coupling locations 183, 184 of the upper links 111, 112, respectively, and that is perpendicular to the longitudinal axis 105 of the top drive 101. In addition, the upper link 111 can comprise a size and configuration, and can be coupled to the main bearing housing 110 at a location, such that a distance extending along the plane 181 between the longitudinal axis 105 of the top drive 101 and a center point of the lower coupling location 183 comprises a length less than one half of the length between the center point of the lower coupling location 183 and a center point of an upper coupling location 185 of upper link 111. Likewise, the upper link 112 can comprise a size and configuration, and can be coupled to the main bearing housing 110 at a location, such that a distance extending along the plane 181 between the longitudinal axis 105 of the top drive 101 and a center point of the lower coupling location 184 comprises a length less than one half of the length between the center point of the lower coupling location 184 and a center point of an upper coupling location 186 of upper link 112.

Generally, when the main bearing housing 110 increases in diameter or width, the coupling distance 181 between the upper links 111, 112 to the main bearing housing 110 increases, which increases bending stresses and can result in a larger and heavier becket and/or bail. Locating the drive motor 130 below the main bearing housing 110 and/or the main bearing 140 (i.e., the swivel) can reduce the distance 181 between the upper links 111, 112 (i.e., the links are closer to the centerline as they are not required to extend around or about a drive motor as in prior top drives with the drive motor located above the main bearing and main bearing housing), which reduces the bending stresses and can result in a smaller and lighter becket and/or bail. The smaller main bearing housing 110 resulting from locating the drive motor 130 below the main bearing housing 110 and/or the main bearing 140 (i.e., the swivel) can also free up space around the main bearing housing 110 for an improved layout of auxiliary components, as well as the installation of additional components that otherwise would not be possible to install. In addition, a smaller or narrower main bearing housing 110 is lighter in weight compared to typical top drive configurations that have the drive motor above the main bearing housing and/or the main bearing, which results in an overall smaller and lighter top drive that can provide wider applicability in various types of rig masts due to the ability to fit smaller rigs.

Additionally, having the drive motor 130 below the main bearing housing 110 and/or the main bearing 140 can enhance serviceability and maintainability and provide better access to the main bearing housing 110, main bearing 140, and other auxiliary components around the main bearing housing 110. For example, there is no need to remove the drive motor 130 to provide access to the main bearing housing 110 and the main bearing 140 during the typical checks and adjustments of bearing endplay. Supporting the drive quill 120 by the main bearing 140 and the main bearing housing 110 above at least a portion of the drive motor 130 can therefore ease the installation and removal of the drive quill 120 (e.g., for service and maintenance), which can save time when servicing the top drive 101. Furthermore, the location of the drive motor 130 below the main bearing housing 110 and/or the main bearing 140 can enable the torque reaction frame 106 to be mounted to one side of the drive motor 130, which can result in a smaller size and lower weight of the torque reaction frame 106. The principles disclosed herein can provide a compact, easy to install and maintain top drive that can also be more responsive to varying drilling conditions when utilizing a direct drive configuration. The recited advantages of locating the drive motor 130 below the main bearing housing 110 and/or the main bearing 140 are not intended to be limiting in any way. Indeed, other advantages will be apparent to those skilled in the art upon reading the disclosure herein and/or practicing the invention.

In accordance with one example, a method for facilitating rotation of a wellbore string is disclosed. The method can comprise providing a wellbore rig top drive having a main bearing housing, a main bearing supported by the main bearing housing, the main bearing being configured to support a weight of a wellbore string and facilitate rotation of the wellbore string about an axis, a quill supported by the main bearing and configured to rotate about the axis, the quill being coupleable to the wellbore string, and a drive motor disposed below the main bearing and supported by the main bearing housing, wherein the drive motor is coupled to the quill to provide torque to rotate the quill about the axis. Additionally, the method can comprise facilitating coupling the wellbore rig top drive to a hoisting apparatus. It is noted that no specific order is required in this method, though generally in one embodiment, these method steps can be carried out sequentially.

In one aspect, facilitating coupling the wellbore rig top drive to the hoisting apparatus can comprise providing first and second upper links directly coupled to the main bearing housing and extending upward to couple to the hoisting apparatus. In a particular aspect, the method can further comprise configuring the first and second upper links such that coupling locations of the first and second upper links to the main bearing housing are separated by a coupling distance, the first upper link having a first link length and the second upper link having a second link length, wherein a ratio of the first or second link length to the coupling distance is less than or equal to X:1.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A wellbore rig top drive, comprising:
   a main bearing housing;
   a main bearing supported by the main bearing housing, the main bearing being configured to support a weight of a wellbore string and facilitate rotation of the wellbore string about an axis;
   a quill supported by the main bearing and configured to rotate about the axis, the quill being coupleable to the wellbore string;
   a drive motor disposed below the main bearing and supported by the main bearing housing, wherein the drive motor is integrally formed with the main bearing housing such that the main bearing housing comprises, at least in part, a drive motor housing of the drive motor; and
   a spindle supported by the main bearing and coupled to the drive motor and the quill, wherein the spindle and the drive motor are arranged on the axis, and the drive motor is operable to transfer torque to the spindle and the spindle is operable to transfer torque to the quill to rotate the quill about the axis.

2. The wellbore rig top drive of claim 1, wherein the quill extends through the drive motor.

3. The wellbore rig top drive of claim 1, wherein the drive motor is coupled to the quill in a direct drive relationship such that the drive motor and the quill rotate at the same speed.

4. The wellbore rig top drive of claim 1, wherein the spindle extends through the drive motor and interfaces with the main bearing.

5. The wellbore rig top drive of claim 1, wherein the main bearing comprises a thrust bearing.

6. The wellbore rig top drive of claim 1, further comprising at least one upper link directly coupled to the main bearing housing and configured to extend upward on an angle relative to a plane extending through a lower coupling location of the at least one upper link perpendicular to a longitudinal axis of the wellbore rig top drive to facilitate suspending the wellbore rig top drive.

7. The wellbore rig top drive of claim 6, wherein the at least one upper link comprises a size and configuration, and can be coupled to the main bearing housing at a location, such that a distance extending along a plane between a longitudinal axis of the top drive and a center point of a lower coupling location of the at least one upper link comprises a length less than one half of the length between the lower coupling location and an upper coupling location of the at least one upper link.

8. The wellbore rig top drive of claim 1, further comprising a torque reaction frame coupleable to a wellbore rig to react torque produced by the drive motor to facilitate rotation of the wellbore string about the axis.

9. The wellbore rig top drive of claim 1, wherein the drive motor comprises an electric motor, a hydraulic motor, or a combination thereof.

10. The wellbore rig top drive of claim 1, wherein the drive motor comprises an alternating current motor, a direct current motor, or a combination thereof.

11. The wellbore rig top drive of claim 1, wherein the drive motor comprises an alternating current permanent magnet motor.

12. A wellbore rig top drive system, comprising:
a wellbore string; and
a wellbore rig top drive coupled to and supporting the wellbore string, the wellbore rig top drive comprising:
a main bearing housing,
a main bearing supported by the main bearing housing, the main bearing being configured to support a weight of the wellbore string and facilitate rotation of the wellbore string about an axis,
a quill supported by the main bearing and configured to rotate about the axis, the quill being coupled to the wellbore string,
a drive motor disposed below the main bearing and supported by the main bearing housing, wherein the drive motor is integrally formed with the main bearing housing such that the main bearing housing comprises, at least in part, a drive motor housing of the drive motor, and
a spindle supported by the main bearing and coupled to the drive motor and the quill, wherein the spindle and the drive motor are arranged on the axis, and the drive motor is operable to transfer torque to the spindle and the spindle is operable to transfer torque to the quill to rotate the quill about the axis.

13. The system of claim 12, wherein the quill extends through the drive motor.

14. The system of claim 12, wherein the drive motor is coupled to the quill in a direct drive relationship such that the drive motor and the quill rotate at the same speed.

15. The system of claim 12, further comprising a hoisting apparatus coupled to and supporting the wellbore rig top drive, wherein the wellbore rig top drive further comprises a first upper link and a second upper link directly coupled to the main bearing housing and extending upward to couple to the hoisting apparatus.

16. The system of claim 15, further comprising at least one upper link directly coupled to the main bearing housing, wherein the at least one upper link comprises a size and configuration, and can be coupled to the main bearing housing at a location, such that a distance extending along a plane between a longitudinal axis of the top drive and a center point of a lower coupling location of the at least one upper link comprises a length less than one half of the length between the lower coupling location and an upper coupling location of the at least one upper link.

17. A method for facilitating rotation of a wellbore string, comprising:
configuring a wellbore rig top drive comprising:
a main bearing housing,
a main bearing supported by the main bearing housing, the main bearing being configured to support a weight of a wellbore string and facilitate rotation of the wellbore string about an axis,
a quill supported by the main bearing and configured to rotate about the axis, the quill being coupleable to the wellbore string,
a drive motor disposed below the main bearing and supported by the main bearing housing, wherein the drive motor is integrally formed with the main bearing housing such that the main bearing housing comprises, at least in part, a drive motor housing of the drive motor, and
a spindle supported by the main bearing and coupled to the drive motor and the quill, wherein the spindle and the drive motor are arranged on the axis, and the drive motor is operable to transfer torque to the spindle and the spindle is operable to transfer torque to the quill to rotate the quill about the axis; and
facilitating coupling the wellbore rig top drive to a hoisting apparatus.

18. The method of claim 17, wherein facilitating coupling the wellbore rig top drive to the hoisting apparatus comprises providing at least one upper link directly coupled to the main bearing housing and extending upward to couple to the hoisting apparatus.

19. The method of claim 18, wherein the at least one upper link comprises a size and configuration, and can be coupled to the main bearing housing at a location, such that a distance extending along a plane between a longitudinal axis of the top drive and a center point of a lower coupling location of the at least one upper link comprises a length less than one half of the length between the lower coupling location and an upper coupling location of the at least one upper link.

20. The method of claim 18, further comprising orienting the at least one upper link on an angle relative to a plane extending through a lower coupling location of the at least one upper link perpendicular to a longitudinal axis of the wellbore rig top drive.

21. A wellbore rig top drive, comprising:
a main bearing housing;
a main bearing supported by the main bearing housing, the main bearing being configured to support a weight of a wellbore string and facilitate rotation of the wellbore string about an axis;
a quill supported by the main bearing and configured to rotate about the axis, the quill being coupleable to the wellbore string;
a drive motor integrally formed with the main bearing housing such that the main bearing housing comprises, at least in part, a drive motor housing of the drive motor, wherein at least a portion of the drive motor is disposed below the main bearing; and
a spindle supported by the main bearing and coupled to the drive motor and the quill, wherein the spindle and the drive motor are arranged on the axis, and the drive motor is operable to transfer torque to the spindle and the spindle is operable to transfer torque to the quill to rotate the quill about the axis.

22. The wellbore rig top drive of claim 21, wherein the drive motor comprises a stator integrally formed with the main bearing housing.

23. The wellbore rig top drive of claim 21, wherein the drive motor comprises an active portion located below the main bearing.

* * * * *